United States Patent
van der Merwe et al.

(10) Patent No.: US 10,851,712 B2
(45) Date of Patent: Dec. 1, 2020

(54) CLEARANCE CONTROL DEVICE

(71) Applicant: General Electric Company, Schenectady, NY (US)

(72) Inventors: Gert Johannes van der Merwe, Lebanon, OH (US); Joel Francis Kirk, Monroe, OH (US)

(73) Assignee: General Electric Company, Schenectady, NY (US)

( * ) Notice: Subject to any disclaimer, the term of this patent is extended or adjusted under 35 U.S.C. 154(b) by 388 days.

(21) Appl. No.: 15/634,098

(22) Filed: Jun. 27, 2017

(65) Prior Publication Data
US 2018/0371997 A1  Dec. 27, 2018

(51) Int. Cl.
| F02C 7/042 | (2006.01) |
| F02C 3/04 | (2006.01) |
| F02C 7/057 | (2006.01) |
| F02C 9/18 | (2006.01) |
| F02C 7/18 | (2006.01) |
| F01D 11/20 | (2006.01) |
| F02C 7/28 | (2006.01) |

(52) U.S. Cl.
CPC .............. *F02C 7/042* (2013.01); *F01D 11/20* (2013.01); *F02C 3/04* (2013.01); *F02C 7/057* (2013.01); *F02C 7/18* (2013.01); *F02C 7/28* (2013.01); *F02C 9/18* (2013.01); *F05D 2220/32* (2013.01); *F05D 2240/35* (2013.01); *F05D 2260/52* (2013.01)

(58) Field of Classification Search
CPC .................................. F01D 11/14; F01D 11/20
See application file for complete search history.

(56) References Cited

U.S. PATENT DOCUMENTS

| 4,419,044 A | * | 12/1983 | Barry | ................... F01D 11/24 |
| | | | | 415/117 |
| 5,993,150 A | * | 11/1999 | Liotta | .................... F01D 11/10 |
| | | | | 415/115 |
| 6,048,170 A | | 4/2000 | Dodd | |
| 7,079,957 B2 | | 7/2006 | Finnigan et al. | |
| 7,435,049 B2 | | 10/2008 | Ghasripoor et al. | |
| 7,549,841 B1 | | 6/2009 | Marussich | |
| 8,608,427 B2 | | 12/2013 | Bock | |
| 8,608,435 B2 | | 12/2013 | Bock | |
| 8,678,742 B2 | | 3/2014 | Klingels | |
| 9,045,994 B2 | | 6/2015 | Bidkar et al. | |
| 9,115,810 B2 | | 8/2015 | Bidkar et al. | |

(Continued)

FOREIGN PATENT DOCUMENTS

| CN | 101899995 | 12/2010 |
| GB | 2223811 A | 4/1990 |

*Primary Examiner* — Brian P Wolcott
*Assistant Examiner* — Jason G Davis
(74) *Attorney, Agent, or Firm* — Hanley, Flight and Zimmerman, LLC

(57) ABSTRACT

A clearance control system includes one or more clearance control devices that include features for controlling the clearances between rotating and stationary components of an engine. In one exemplary aspect, a clearance control device utilizes a fluid to pressurize an actuation chamber defined by a compliant member of the clearance control device. The pressurization of the actuation chamber causes the actuation chamber to expand in a direction that changes the clearance between the stationary and rotating components of the engine.

20 Claims, 8 Drawing Sheets

(56) References Cited

U.S. PATENT DOCUMENTS

| | | | |
|---|---|---|---|
| 9,903,218 B2* | 2/2018 | Hafner | F01D 11/22 |
| 10,378,387 B2* | 8/2019 | Baldiga | F01D 11/08 |
| 2016/0010480 A1 | 1/2016 | Bidkar et al. | |
| 2016/0097303 A1 | 4/2016 | Baldiga et al. | |

* cited by examiner

CLEARANCE CONTROL DEVICE

FIELD

The present subject matter relates generally to gas turbine engines. More particularly, the present subject matter relates to clearance control systems and devices therefore for gas turbine engines.

BACKGROUND

Optimization of blade tip clearances can lead to better engine performance and efficiency. Conventionally, the clearances between the rotating and stationary turbomachinery components of an engine have been adjusted by Active Clearance Control (ACC) systems. For example, certain conventional ACC systems deliver thermal control air, such as e.g., fan bypass air, to impinge on a flange such that the radial position of the casing and shrouds can be adjusted with respect to the tips of the rotating turbine blades. The lower temperature of the thermal control air coupled with the casing material's coefficient of thermal expansion causes the casing to reduce in diameter, thereby providing tighter clearances between the blade tips and shroud.

One issue with conventional ACC systems is that such systems require complex valves, panels, and ducts for routing thermal control air extracted from outside of the casing to the flanges. Such components increase the weight of the engine. Additionally, when thermal control air is extracted, there is a penalty on the engine efficiency cycle. For example, when air is extracted from a bypass duct of a turbofan engine, the extracted air is no longer available for useful work, or in this example, the extracted air is no longer available to provide thrust. Moreover, conventional ACC systems seek to control the diameter of the casing relative to the rotors of the engine. In doing so, such conventional ACC systems must account for large thermal masses and the response times associated with the thermal expansion and contraction of such thermal masses. Thus, conventional ACC systems typically allow for a lag time to elapse before making adjustments to account for the thermal masses. During such lag times, engine performance and efficiency is not optimized.

Therefore, an improved clearance control system for an engine and device therefore that addresses one or more of the noted challenges would be desirable.

BRIEF DESCRIPTION

Exemplary aspects of the present disclosure are directed to clearance control systems for engines and devices therefore that include features for controlling the clearances between rotating and stationary components of the engine. Aspects and advantages of the invention will be set forth in part in the following description, or may be obvious from the description, or may be learned through practice of the invention.

In one exemplary aspect, the present disclosure is directed to a clearance control device for an engine, the clearance control device defining an axial direction, a radial direction, and a circumferential direction. The clearance control device includes a hanger portion. The clearance control device also includes a shroud portion. The clearance control device further includes a compliant member mechanically coupling the hanger portion with the shroud portion and defining an actuation chamber for receiving a fluid. The shroud portion is moveable along the radial direction in response to a pressure change within the actuation chamber.

In another exemplary aspect, the present disclosure is directed to a gas turbine engine defining an axial direction, a radial direction, and a circumferential direction. The gas turbine engine includes a compressor section, a combustion section, and a turbine section in serial flow relationship and together at least partially defining a core air flowpath, the combustion section defining a diffuser cavity and a combustion chamber, the diffuser cavity located upstream of the combustion chamber. The gas turbine engine further includes a clearance control device. The clearance control device includes a hanger portion and a shroud portion. The clearance control device further includes a compliant member mechanically coupling the hanger portion with the shroud portion and defining an actuation chamber in fluid communication with the diffuser cavity, wherein the shroud portion is moveable along the radial direction in response to a pressure change within the actuation chamber.

In a further exemplary aspect, the present disclosure is directed to a method for adjusting the blade tip clearances of a gas turbine engine, the gas turbine engine defining an axial direction, a radial direction, and a circumferential direction. The gas turbine engine includes a plurality of blades rotatable about the axial direction and a clearance control device disposed about the circumferential direction and spaced apart from the blades along the radial direction. Each clearance control device has a hanger portion, a shroud portion, and a compliant member mechanically coupling the hanger portion with the shroud portion, the compliant member defining an actuation chamber. The method further includes operating the gas turbine engine. The method also includes pressurizing the actuation chamber of the compliant member such that the shroud portion is displaced along the radial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
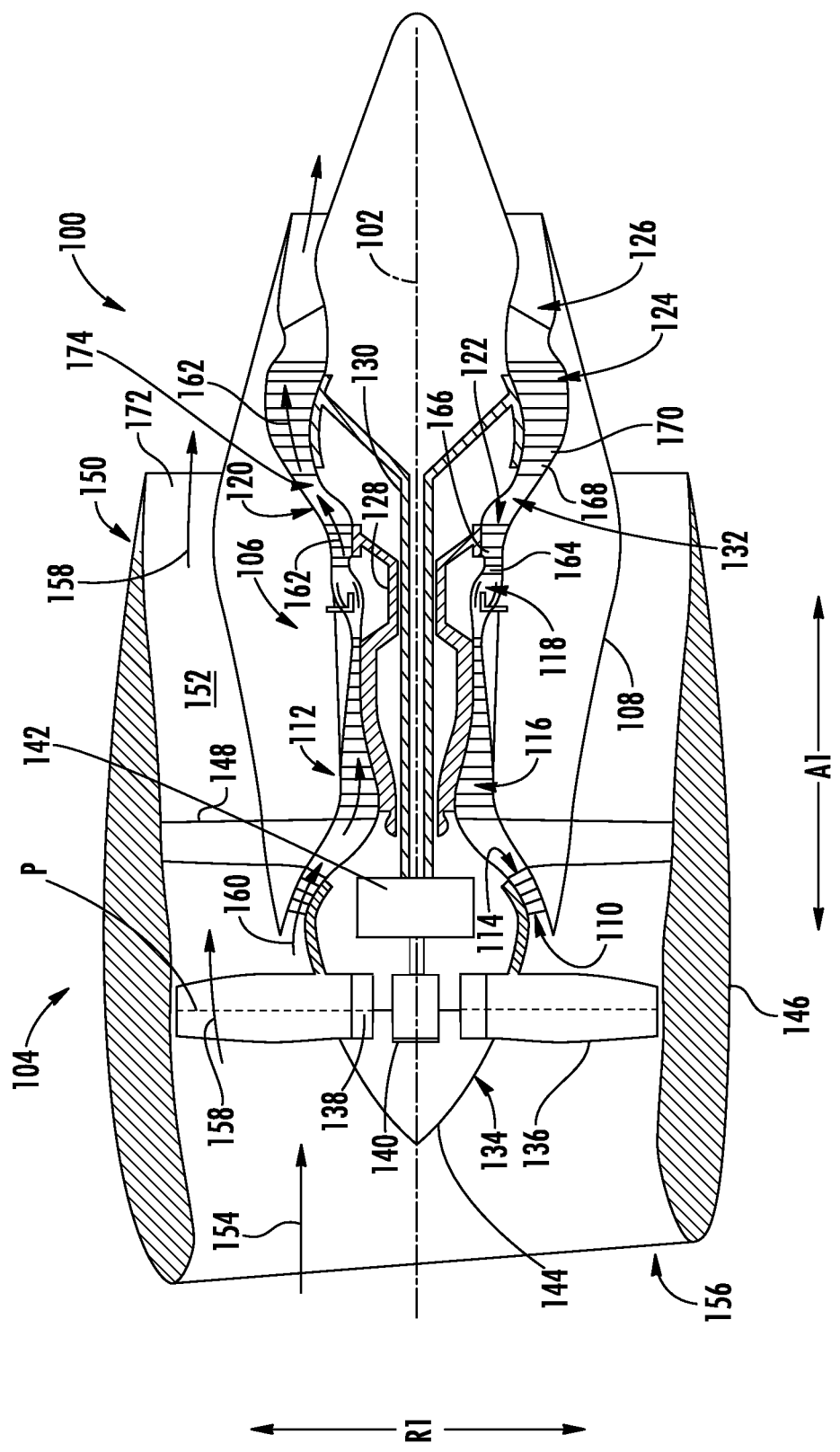
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. "HP" denotes high pressure and "LP" denotes low pressure.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a turbine shroud incorporated into a turbofan jet engine for purposes of illustration, one of ordinary skill in the art will readily appreciate that embodiments of the present invention may be applied to any turbine incorporated into any turbomachine and are not limited to a gas turbofan jet engine unless specifically recited in the claims.

Exemplary aspects of the present disclosure are directed to a clearance control system and device therefore that includes features for controlling the clearances between rotating and stationary components of an engine. In particular, in one exemplary aspect, the present disclosure is directed to an active clearance control system having a clearance control device that utilizes a fluid to pressurize an actuation chamber defined by the clearance control device. The pressurization of the actuation chamber causes the actuation chamber to expand in a direction that changes the clearance between the stationary and rotating components of the engine. Exemplary methods for operating a gas turbine engine are also provided.

Referring now to the drawings, FIG. 1 is a schematic cross-sectional view of a gas turbine engine 100 in accordance with an exemplary embodiment of the present disclosure. More particularly, for the embodiment of FIG. 1, the gas turbine engine 100 is an aeronautical, high-bypass turbofan jet engine configured to be mounted to an aircraft, such as in an under-wing configuration or tail-mounted configuration. As shown in FIG. 1, the gas turbine engine 100 defines an axial direction A1 (extending parallel to or coaxial with a longitudinal centerline 102 provided for reference), a radial direction R1, and a circumferential direction C1 (i.e., a direction extending about the axial direction A1; not depicted in FIG. 1). In general, the gas turbine engine 100 includes a fan section 104 and a core turbine engine 106 disposed downstream from the fan section 104.

The exemplary core turbine engine 106 depicted generally includes a substantially tubular outer casing 108 that defines an annular inlet 110. The outer casing 108 encases, in serial flow relationship, a compressor section 112 including a first, booster or LP compressor 114 and a second, HP compressor 116; a combustion section 118; a turbine section 120 including a first, HP turbine 122 and a second, LP turbine 124; and a jet exhaust nozzle section 126. An HP shaft or spool 128 drivingly connects the HP turbine 122 to the HP compressor 116. A LP shaft or spool 130 drivingly connects the LP turbine 124 to the LP compressor 114. The compressor section, combustion section 118, turbine section, and jet exhaust nozzle section 126 together define a core air flowpath 132 through the core turbine engine 106.

Referring still the embodiment of FIG. 1, the fan section 104 includes a variable pitch fan 134 having a plurality of fan blades 136 coupled to a disk 138 in a circumferentially spaced apart manner. As depicted, the fan blades 136 extend outwardly from disk 138 generally along the radial direction R. Each fan blade 136 is rotatable relative to the disk 138 about a pitch axis P by virtue of the fan blades 136 being operatively coupled to a suitable actuation member 140 configured to collectively vary the pitch of the fan blades 136, e.g., in unison. The fan blades 136, disk 138, and actuation member 140 are together rotatable about the longitudinal centerline 102 by LP shaft 130 across a power gear box 142. The power gear box 142 includes a plurality of gears for stepping down the rotational speed of the LP shaft 130 to a more efficient rotational fan speed.

Referring still to the exemplary embodiment of FIG. 1, the disk 138 is covered by rotatable spinner 144 aerodynamically contoured to promote an airflow through the plurality of fan blades 136. Additionally, the exemplary fan section 104 includes an annular fan casing or outer nacelle 146 that circumferentially surrounds the fan 134 and/or at least a portion of the core turbine engine 106. Moreover, for the embodiment depicted, the nacelle 146 is supported relative to the core turbine engine 106 by a plurality of circumferentially spaced outlet guide vanes 148. Further, a downstream section 150 of the nacelle 146 extends over an outer portion of the core turbine engine 106 so as to define a bypass airflow passage 152 therebetween.

During operation of the gas turbine engine 100, a volume of air 154 enters the gas turbine engine 100 through an associated inlet 156 of the nacelle 146 and/or fan section 104. As the volume of air 154 passes across the fan blades 136, a first portion of the air as indicated by arrows 158 is directed or routed into the bypass airflow passage 152 and a second portion of the air as indicated by arrow 160 is directed or routed into the LP compressor 114. The pressure of the second portion of air 160 is then increased as it is routed through the HP compressor 116 and into the combustion section 118.

Referring still to FIG. 1, the compressed second portion of air 160 from the compressor section mixes with fuel and is burned within the combustion section 118 to provide combustion gases 162. The combustion gases 162 are routed from the combustion section 118 along the hot gas path 174, through the HP turbine 122 where a portion of thermal and/or kinetic energy from the combustion gases 162 is extracted via sequential stages of HP turbine stator vanes 164 that are coupled to the outer casing 108 and HP turbine rotor blades 166 that are coupled to the HP shaft or spool 128, thus causing the HP shaft or spool 128 to rotate, thereby supporting operation of the HP compressor 116. The combustion gases 162 are then routed through the LP turbine 124 where a second portion of thermal and kinetic energy is extracted from the combustion gases 162 via sequential stages of LP turbine stator vanes 168 that are coupled to the outer casing 108 and LP turbine rotor blades 170 that are coupled to the LP shaft or spool 130, thus causing the LP shaft or spool 130 to rotate, thereby supporting operation of the LP compressor 114 and/or rotation of the fan 134.

The combustion gases 162 are subsequently routed through the jet exhaust nozzle section 126 of the core turbine engine 106 to provide propulsive thrust. Simultaneously, the pressure of the first portion of air 158 is substantially increased as the first portion of air 158 is routed through the bypass airflow passage 152 before it is exhausted from a fan nozzle exhaust section 172 of the gas turbine engine 100, also providing propulsive thrust. The HP turbine 122, the LP turbine 124, and the jet exhaust nozzle section 126 at least partially define a hot gas path 174 for routing the combustion gases 162 through the core turbine engine 106.

It will be appreciated that the exemplary gas turbine engine 100 depicted in FIG. 1 is by way of example only, and that in other exemplary embodiments, the gas turbine engine 100 may have any other suitable configuration. Additionally, or alternatively, aspects of the present disclosure may be utilized with any other suitable aeronautical gas turbine engine, such as a turboshaft engine, turboprop engine, turbojet engine, etc. Further, aspects of the present disclosure may further be utilized with any other land-based gas turbine engine, such as a power generation gas turbine engine, or any aeroderivative gas turbine engine, such as a nautical gas turbine engine.

Figure 2:
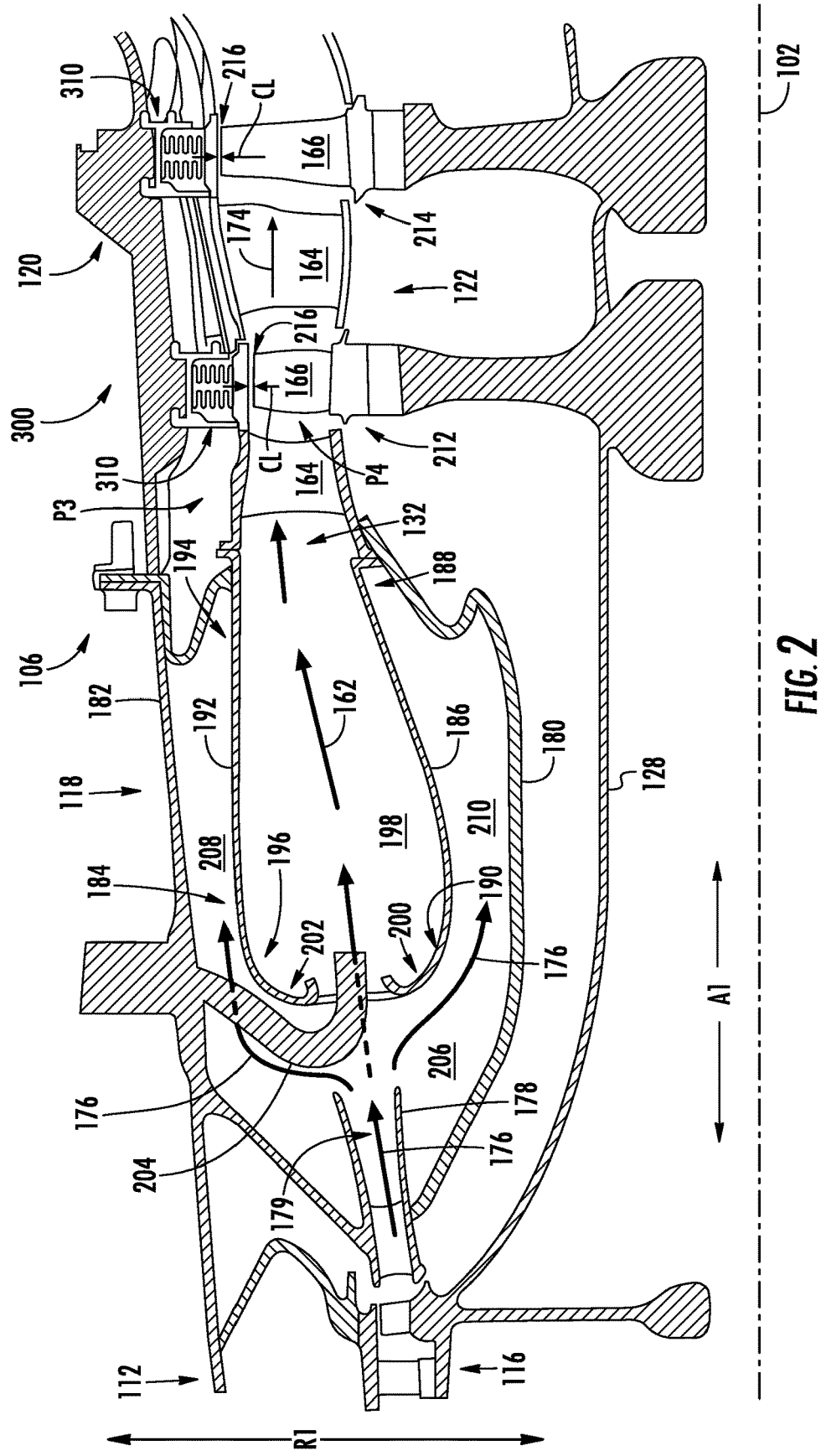
FIG. 2 is a side cross-sectional view of a compressor section, a combustion section, and a high pressure turbine section of the gas turbine engine shown in FIG. 1.

FIG. 2 provides a side cross-sectional view of the compressor section 112, combustion section 118, and the turbine section 120 of the core turbine engine 106 of FIG. 1. More specifically, the rear end of the HP compressor 116, the combustion section 118, and the forward end of the HP turbine 122 are illustrated. As shown in FIG. 2, for this exemplary embodiment, compressed air 176 exits the HP compressor 116 through a diffuser 178 located at the aft end or outlet of the HP compressor 116 and is discharged into the combustion section 118. The diffuser 178 defines a diffuser cavity 179 through which the compressed air 176 flows. Once the compressed air 176 is discharged into the combustion section 118, the compressed air 176, or P3 air, flows into various chambers of the combustion section 118 as will be described below.

The combustion section 118 of the core turbine engine 106 is annularly encased by radially inner and outer combustor casings 180, 182. The radially inner combustor casing 180 and the radially outer combustor casing 182 both extend generally along the axial direction A1 and surround a combustor assembly 184 in annular rings. The inner and outer combustor casings 180, 182 are joined together at the annular diffuser 178 at the forward end of the combustion section 118.

As further shown in FIG. 2, the combustor assembly 184 generally includes an inner liner 186 extending between a rear end 188 and a forward end 190 generally along the axial direction A1, as well as an outer liner 192 also extending between a rear end 194 and a forward end 196 generally along the axial direction A1. The inner and outer liners 186, 192 together at least partially define a combustion chamber 198 therebetween. The inner and outer liners 186, 192 are each attached to or formed integrally with an annular dome. More particularly, the annular dome includes an inner dome section 200 formed integrally with the forward end 190 of the inner liner 186 and an outer dome section 202 formed generally with the forward end 196 of the outer liner 192. Further, the inner and outer dome sections 200, 202 may each be formed integrally (or alternatively may be formed of a plurality of components attached in any suitable manner) and may each extend along the circumferential direction C1 to define an annular shape. It should be appreciated, however, that in other embodiments, the combustor assembly 184 may not include the inner and/or outer dome sections 200, 202; may include separately formed inner and/or outer dome sections 200, 202 attached to the respective inner liner 186 and outer liner 192; or may have any other suitable configuration.

Referring still to FIG. 2, the combustor assembly 184 further includes a plurality of fuel air mixers 204 spaced apart along the circumferential direction C1 and positioned at least partially within the annular dome. More particularly, the plurality of fuel air mixers 204 are disposed at least partially between the outer dome section 202 and the inner dome section 200 along the radial direction R1. Compressed air 176 (P3 air) from the compressor section 112 of the gas turbine engine 100 flows into or through the fuel air mixers 204, where the compressed air 176 is mixed with fuel and ignited to create combustion gases 162 within the combustion chamber 198. The inner and outer dome sections 200, 202 are configured to assist in providing such a flow of compressed air 176 from the compressor section 112 into or through the fuel air mixers 204.

As discussed above, the combustion gases 162 flow from the combustion chamber 198 into and through the turbine section 120 of the gas turbine engine 100, where a portion of thermal and/or kinetic energy from the combustion gases 162 is extracted via sequential stages of turbine stator vanes and turbine rotor blades within the HP turbine 122 and LP turbine 124 (FIG. 1). More specifically, as depicted in FIG. 2, combustion gases 162 from the combustion chamber 198 flow into the HP turbine 122 located immediately downstream of the combustion chamber 198 where thermal and/or kinetic energy from the combustion gases 162 is extracted via sequential stages of HP turbine stator vanes 164 and HP turbine rotor blades 166 and then into the LP turbine in a similar fashion.

As illustrated in FIG. 2, not all of the compressed air 176 discharged from the diffuser 178 flows into or directly through the fuel air mixers 204 and into the combustion chamber 198. Indeed, a portion of the compressed air 176 is discharged into a plenum 206 surrounding the combustor assembly 184. The plenum 206 is generally defined annularly between the combustor casings 180, 182 and the liners 186, 192. The outer combustor casing 182 and the outer liner 192 define an outer plenum 208 generally disposed radially outward of the combustion chamber 198. The inner combustor casing 180 and the inner liner 186 define an inner plenum 210 generally disposed radially inward of the combustion chamber 198. As compressed air 176 is diffused by diffuser 178, a portion of the compressed air 176 flows radially outward into the outer plenum 208 and a portion of the compressed air 176 flows radially inward into the inner plenum 210.

The portion of the compressed air 176 flowing into the outer plenum 208 flows generally along the axial direction A1 to the turbine section 120. Specifically, a portion of the compressed air 176 flows radially outward of the stator vanes and rotor blades 164, 166 of the HP turbine 122 through the outer plenum 208. The outer plenum 208 may extend to the LP turbine 124 (FIG. 1) as well. The compressed air 176 within the outer plenum 208 has a pressure P3. The combustion gases 162 flowing through the hot gas path 174 of the HP turbine 122 has a pressure P4. Generally, the pressure P3 within the outer plenum 208 is greater than the pressure P4 within the hot gas path 174 of the HP turbine 122 during operation of the gas turbine engine 100. However, in some instances, when the gas turbine engine 100 is not in operation or when gas turbine engine 100 experiences a stall, P3 may not be greater than P4.

As further shown in FIG. 2, for this embodiment, the HP turbine 122 of the gas turbine engine 100 includes one or more clearance control devices 310 that collectively form a clearance control system 300. It should be noted that clearance control devices 310 may additionally or alternatively be utilized in a similar manner in the LP compressor 114, HP compressor 116, and/or LP turbine 124. Accordingly, the clearance control devices 310 disclosed herein are not limited to use in the HP turbine 122, and rather may be utilized in any suitable section of the gas turbine engine 100.

Referring still to FIG. 2, the clearance control devices 310 form annular rings about the annular arrays of HP turbine rotor blades 166. More particularly, for this embodiment, clearance control devices 310 form an annular ring disposed about the annular array of turbine rotor blades 166 of a first stage 212 of the HP turbine 122 and form an annular ring disposed about the annular array of turbine rotor blades 166 of the second stage 214 of the HP turbine 122. In general, each clearance control device 310 includes a shroud portion that is radially spaced from the blade tips 216 of the rotor blades 166. In this way, a gap or blade tip clearance CL is defined between the shroud portions of the clearance control devices 310 and the blade tips 216 of the rotor blades 166. The high pressure compressed air 176 having a pressure P3 can flow through the outer plenum 208 and about the clearance control devices 310, and as will be described further herein, a portion of the compressed air 176 can flow into an actuation chamber of one or more of the clearance control devices 310 such that the clearance control devices 310 can control the blade tip clearance CL (i.e., the radial spacing between the stationary shroud portion of the clearance control device 310 and the rotating turbine blades 166).

Engine performance is dependent at least in part on the blade tip clearances CL between the turbine blade tips and the shroud portions of the clearance control devices 310. Generally, the tighter the clearance between the blade tips and shroud portions (i.e., the more closed the clearances), the more efficient the gas turbine engine 100 can be operated. Thus, minimizing the blade tip clearances CL facilitates optimal engine performance and efficiency. A challenge in minimizing the blade tip clearances CL, however, is that the blades and rotors of the engine expand and contract at different rates than the casings circumferentially surrounding them.

More particularly, the blade tip clearances CL between turbine blade tips and the surrounding shroud portions may be impacted by two main types of loads: power-induced engine loads and flight loads. Power-induced engine loads generally include centrifugal, thermal, internal pressure, and thrust loads. Flight loads generally include inertial, aerodynamic, and gyroscopic loads. Centrifugal and thermal engine loads are responsible for the largest radial variation in blade tip clearances CL. With regard to centrifugal loads, the rotor blades of turbine engines may mechanically expand or contract depending on their rotational speed. Generally, the faster the rotational speed of the rotor, the greater the mechanical expansion of the turbine blades and thus the further radially outward the rotor blades extend. Conversely, the slower the rotational speed of the rotor, the less mechanical expansion it experiences and thus the further radially inward the blades extend from the longitudinal centerline of the engine. With regard to thermal loads, as the engine heats up or cools down during operation, the rotor and casings thermally expand and/or contract at differing rates. That is, the rotor is relatively large and heavy, and thus its thermal mass heats up and cools down at a much slower rate than does the relatively thin and light casings. Thus, the thermal mass of the casings heats up and cools off much faster than the rotor. Accordingly, as the engine or engines of an aircraft perform various power level changes, the rotor and casings contract and expand at different rates. Meaning, they are sometimes not thermally matched. This leads to changes in the blade tip clearances CL, and in some cases, the turbomachinery components may come into contact with or rub one another, causing a rub event. Rub events may cause poor engine performance and efficiency, may reduce the effective service lives of the turbine blades and shroud portions of clearance control devices, and may deteriorate the exhaust gas temperature margin of the engine. Thus, ideally, the blade tip clearances CL are set so as to minimize the clearance between the blade tips and the shrouds without the turbomachinery components experiencing rub events.

Figure 3:
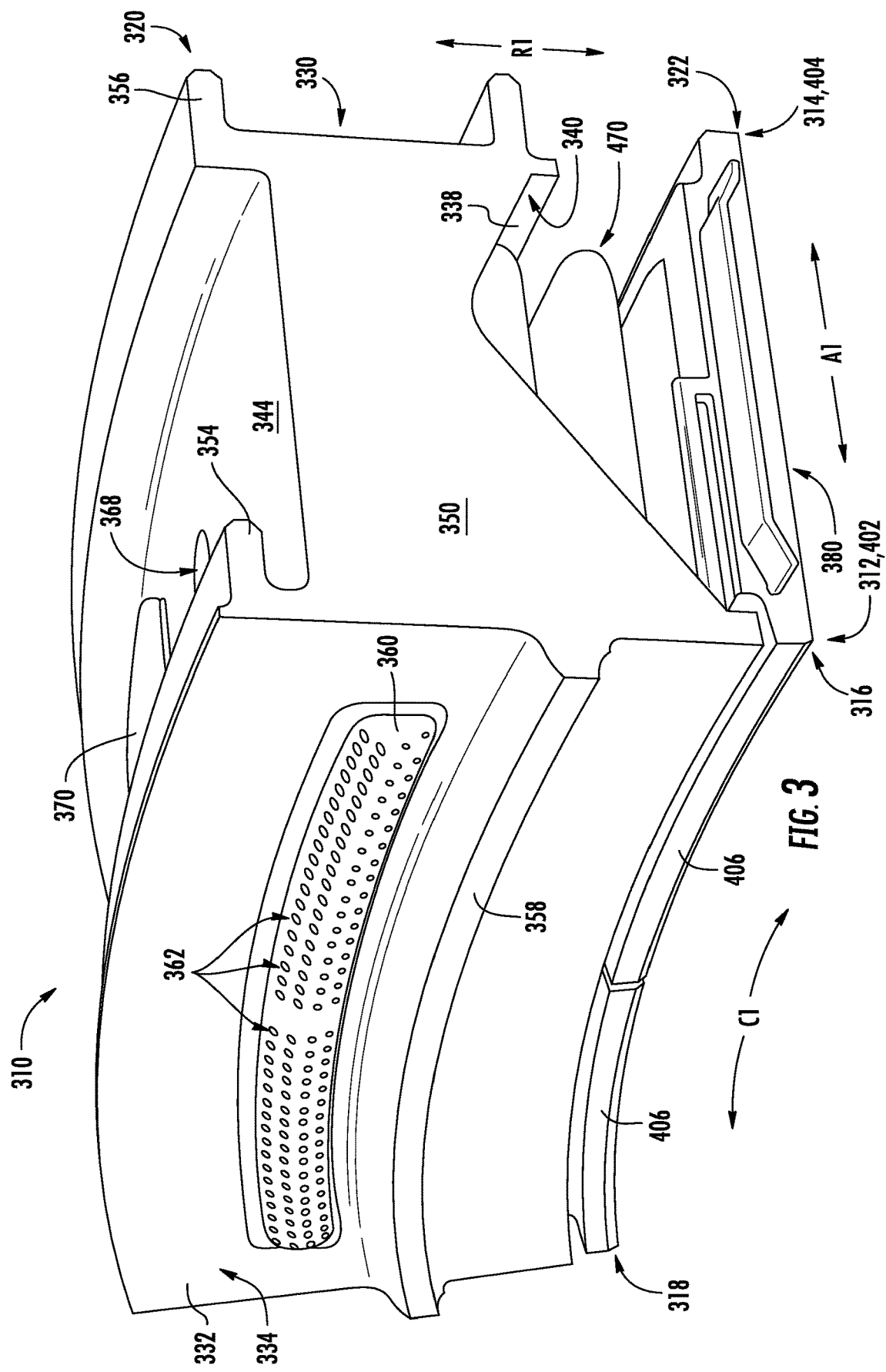
FIG. 3 is a perspective view of an exemplary clearance control device according to various embodiments of the present subject matter.
Figure 4:
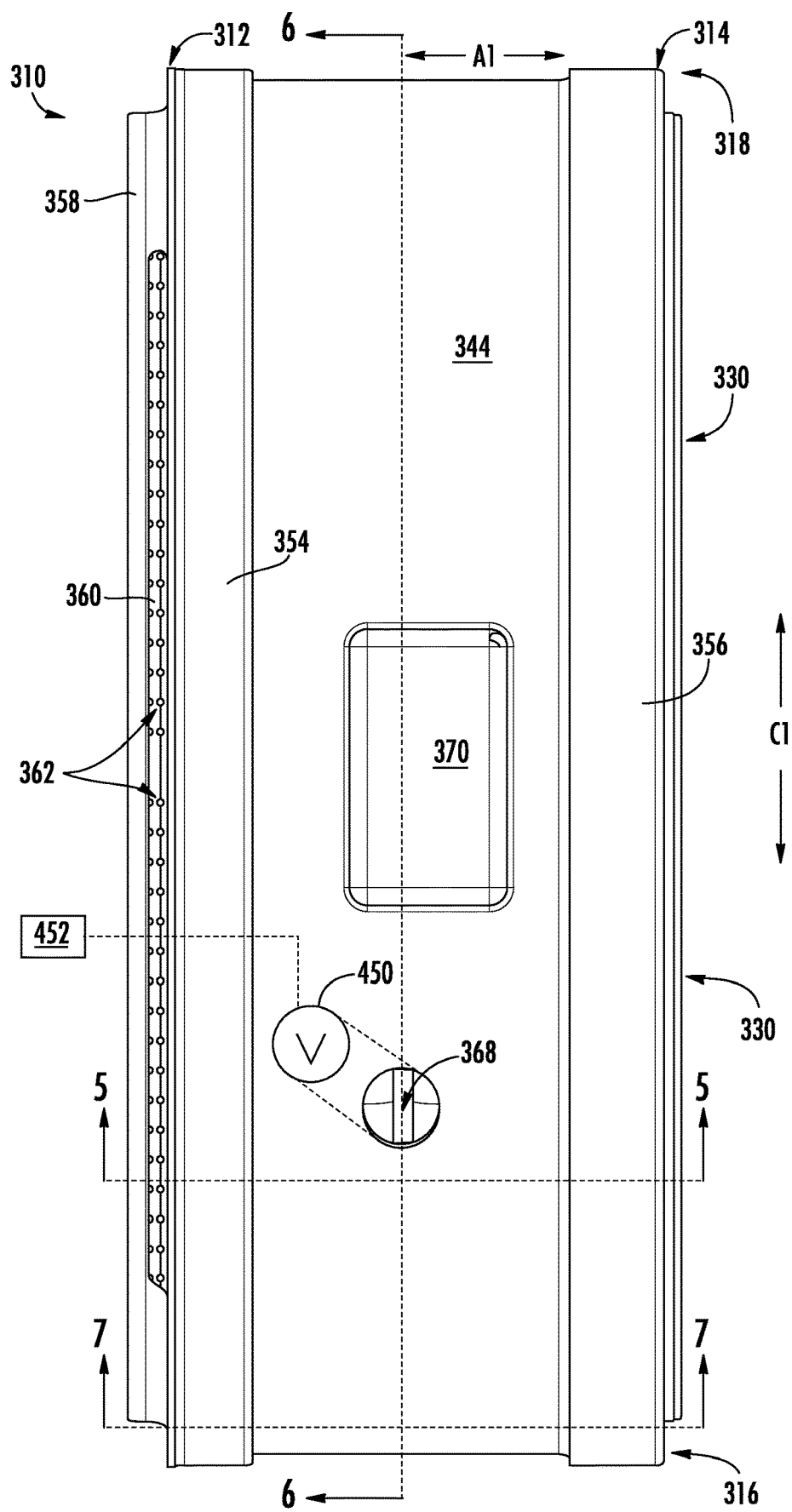
FIG. 4 is a top view of the exemplary clearance control device of FIG. 3.
Figure 5:
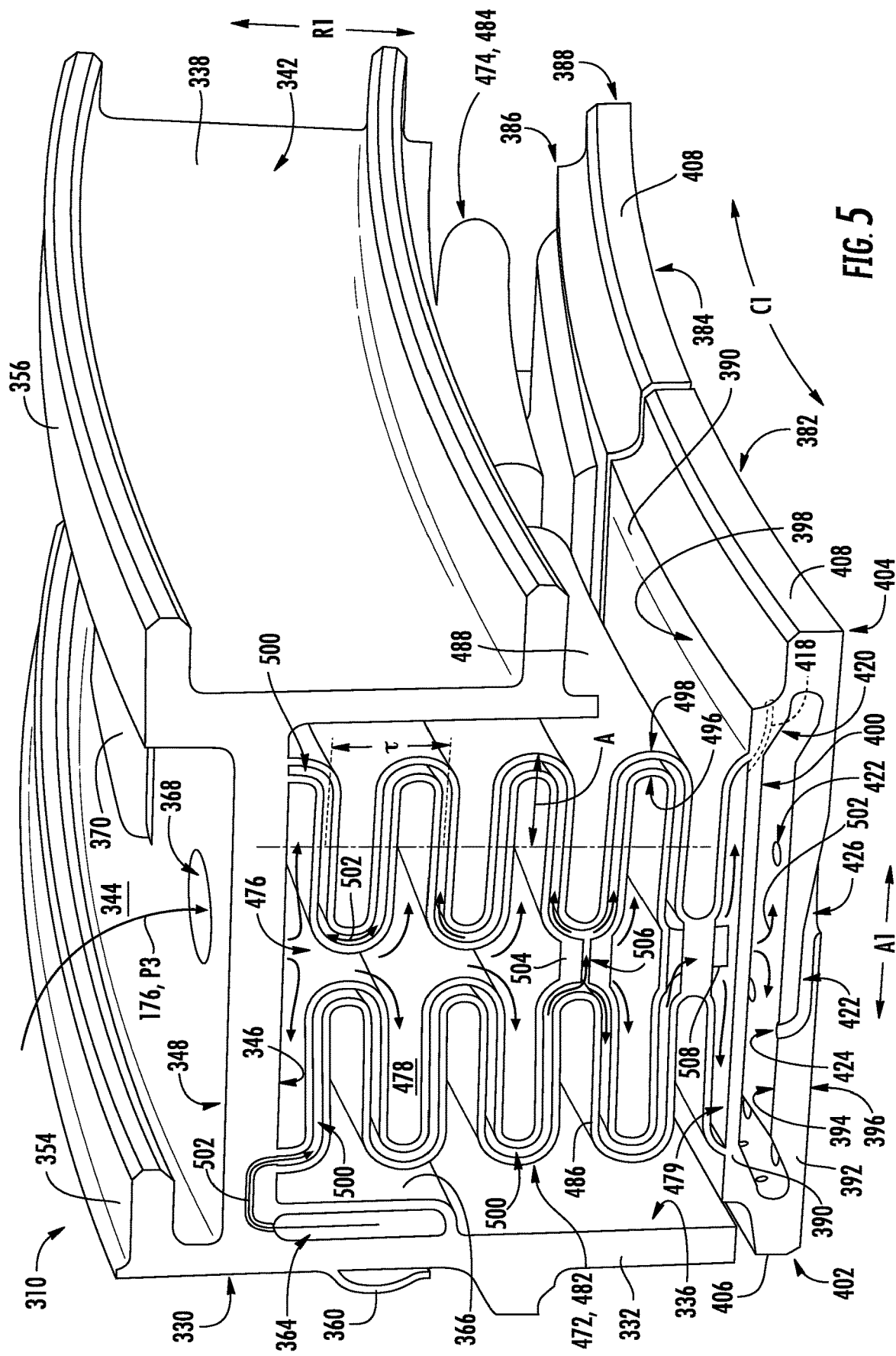
FIG. 5 is a perspective, cross-sectional view of the exemplary clearance control device taken on line 5-5 of FIG. 4.
Figure 6:
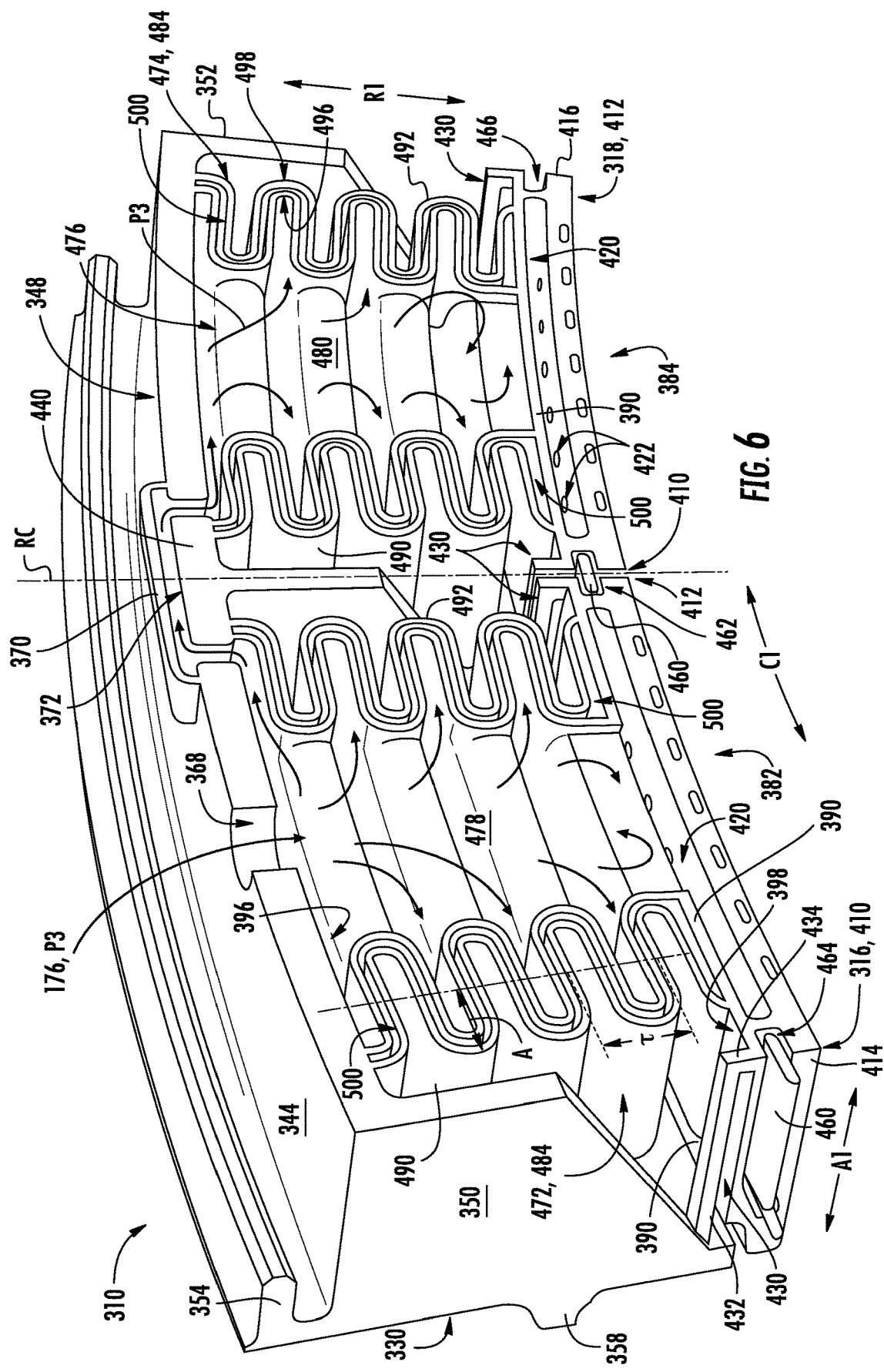
FIG. 6 is a perspective, cross-sectional view of the exemplary clearance control device taken on line 6-6 of FIG. 4.
Figure 7:
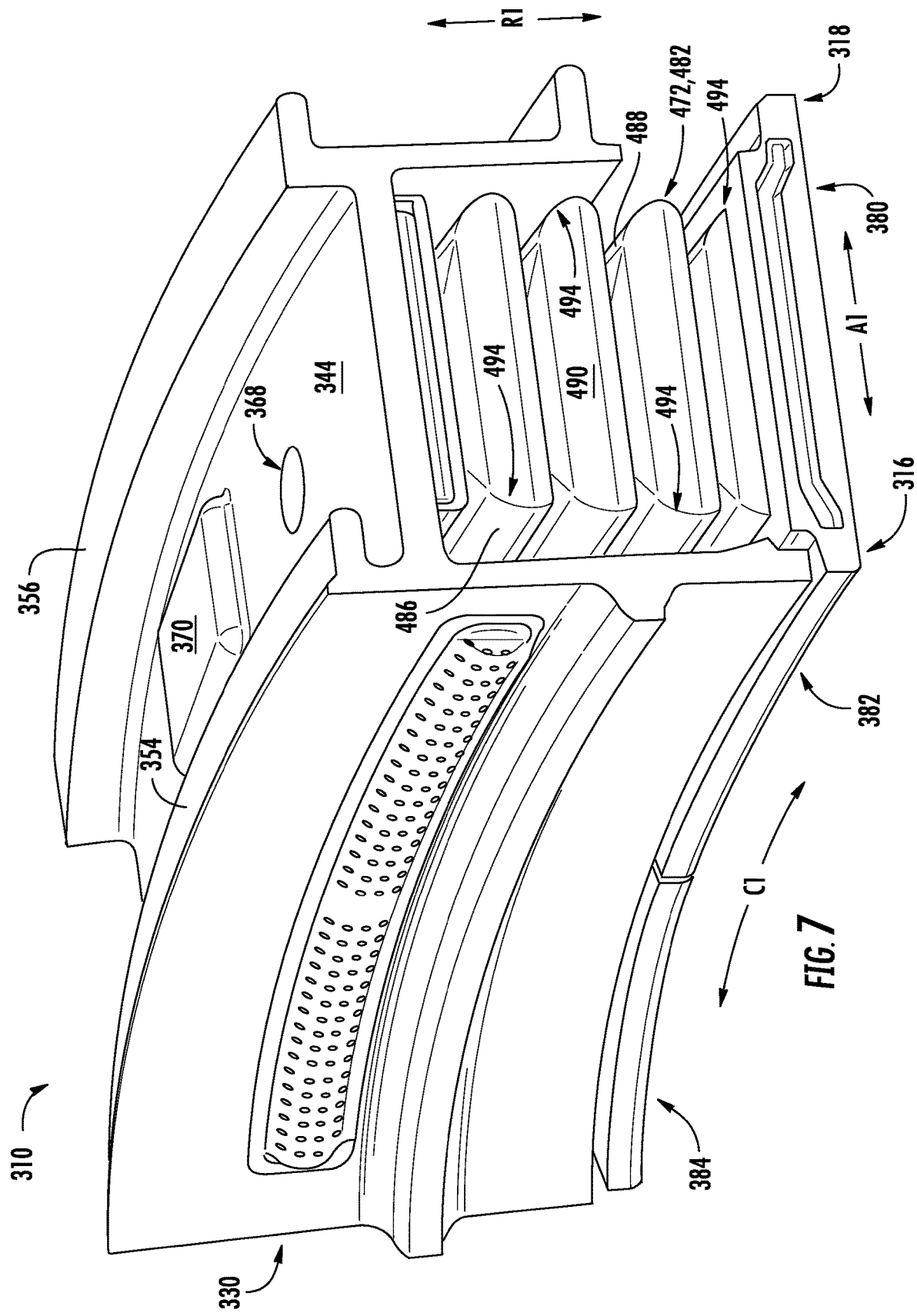
FIG. 7 is a perspective, cross-sectional view of the exemplary clearance control device taken on line 7-7 of FIG. 4.

With reference now to FIGS. 3 through 7, an exemplary clearance control device 310 will be described. In particular, FIG. 3 provides a perspective view of the exemplary clearance control device 310. FIG. 4 provides a top view thereof. FIG. 5 provides a perspective, cross-sectional view thereof taken on line 5-5 of FIG. 4. FIG. 6 provides a perspective, cross-sectional view thereof taken on line 6-6 of FIG. 4. FIG. 7 provides a perspective, cross-sectional view thereof taken on line 7-7 of FIG. 4. In some exemplary embodiments, the clearance control device 310 is positioned in at least one of the compressor section 112 and the turbine section 120 and at least partially defines the core air flowpath 132 (FIG. 2). By way of example, the clearance control devices 310 can be disposed about the rotor blades 166 of the HP turbine 122 of the gas turbine engine 100 of the illustrated embodiment of FIG. 2. In other exemplary embodiments, clearance control devices 310 can be located in other sections or locations within the gas turbine engine 100.

As shown in FIG. 3, the clearance control device 310 defines an axial direction A1, a radial direction R1, and a circumferential direction C1. In this regard, the clearance control device 310 is defined by the same directional system as the gas turbine engine 100. The clearance control device 310 extends between a forward end 312 and an aft end 314 along the axial direction A1, between a first end 316 and a second end 318 along the circumferential direction C1, and between a radially outer portion or top end 320 and a radially inward or bottom end 322 along the radial direction R1. In addition, the clearance control device 310 defines a radial centerline RC extending along the radial direction R1 (FIG. 6).

Generally, for this exemplary embodiment as shown in FIG. 3, the clearance control device 310 includes a hanger portion 330, a shroud portion 380, and a compliant member 470. The shroud portion 380 is mechanically coupled to the hanger portion 330. In particular, the shroud portion 380 is mechanically coupled to the hanger portion 330 by the compliant member 470. In some exemplary embodiments, compliant member 470 can directly connect with the shroud portion 380 and can directly connect with the hanger portion 330. In other exemplary embodiments, the compliant member 470 can indirectly connect with the shroud portion 380 and can indirectly connect with the hanger portion 330. In this way, the compliant member 470 can directly or indirectly connect with the shroud portion 380 and the compliant member 470 can directly or indirectly connect with the hanger portion 470. The hanger portion 330, the shroud portion 380, and the compliant member 470 will be discussed in turn.

With reference generally to FIGS. 3 and 5, the hanger portion 330 includes a forward wall 332 having a forward surface 334 (FIG. 3) and an aft surface 336 (FIG. 5) opposite the forward surface 334. The hanger portion 330 also includes an aft wall 338 having a forward surface 340 (FIG. 3) and an aft surface 342 (FIG. 5) opposite the forward surface 340. The aft wall 338 is spaced apart from the forward wall 332 along the axial direction A1. The forward wall 332 and the aft wall 338 both extend generally in a plane along the radial direction R1 and the circumferential direction C1 and each have a thickness along the axial direction A1. A top wall 344 extends between and connects the forward wall 332 and the aft wall 338. The top wall 344 extends in a plane along the axial direction A1 and circumferential direction C1. The top wall 344 has a thickness along the radial direction R1 (FIG. 5). The top wall 344 has an inner surface 346 and an outer surface 348 opposite the inner surface 346. The hanger portion 330 also includes a first sidewall 350 connecting the forward wall 332, top wall 344, and aft wall 338 proximate the first end 316 of the clearance control device 310 (FIG. 3). Moreover, the hanger portion 330 also includes a second sidewall 352 connecting the forward wall 332, top wall 344, and aft wall 338 proximate the second end 318 of the clearance control device 310 (FIG. 6). The first and second sidewalls 350, 352 extend in a plane along the axial direction A1 and the radial direction R1 and each have a thickness along the circumferential direction C1.

In addition, with reference to FIG. 3, the forward wall 332 and the top wall 344 define a forward hanger 354 proximate the forward end 312 of the clearance control device 310. The forward hanger 354 extends generally along the circumferential direction C1. The aft wall 338 and the top wall 344 define an aft hanger 356 proximate the aft end 314 of the clearance control device 310. The aft hanger 356 likewise extends along the circumferential direction C1. As shown in FIG. 3, the aft hanger 356 is spaced apart from the forward hanger 354 along the axial direction A1. The forward and aft hangers 354, 356 couple the clearance control device 310 to a casing of the core turbine engine 106 or some other suitable structure (FIG. 2).

As shown in FIG. 3, the forward wall 332 includes a circumferential band 358 protruding from the forward surface 334 of the front wall 332 in the axial direction A1 and extending along the circumferential direction C1 the circumferential length of the hanger portion 330. In particular, the circumferential band 358 protrudes in a forward direction along the axial direction A1 from the forward surface 334 of the forward wall 332. The circumferential band 358 takes on axial loads from and propagates the axial forces circumferentially along the clearance control device 310.

As further shown in FIGS. 3 through 5, the forward wall 332 includes a dust cap 360. More particularly, the dust cap 360 protrudes in a forward direction along the axial direction A1 from the forward surface 334 of the forward wall 332 and extends along the radial direction R1 and the circumferential direction C1. The dust cap 360 defines a plurality of openings 362 for receiving fluid therethrough. As shown more particularly in FIG. 5, the fluid that passes through the openings 362 of the dust cap 360 flows into a cooling plenum 364 defined by a portion 366 of the aft surface 336 of the forward wall 332.

As shown further in FIGS. 4 and 5, the top wall 344 of the hanger portion 330 defines a feed opening 368 extending therethrough. For this embodiment, the feed opening 368 is a circular opening. However, in other exemplary embodiments, the feed opening 368 can be any suitable shape. The feed opening 368 is in fluid communication with the diffuser cavity 179 such that a portion of compressed air 176 having a pressure P3 discharged from the diffuser cavity 179 can flow along the outer plenum 208 and eventually radially inward into the clearance control device 310. As explained more fully below, the feed opening 368 is also in fluid communication with an actuation chamber defined by the compliant member 470. In this way, the feed opening 368 provides fluid communication between the diffuser cavity 179 the actuation chamber of the clearance control device 310.

The shroud portion 380 is positioned radial outward of the blade tips 216 of the turbine rotor blades 166 and at least partially defines the core air flowpath 132 (FIG. 2). The shroud portion 380 includes one or more shroud segments. In particular, as shown in FIGS. 5 and 6, for this exemplary embodiment, the shroud portion 380 includes a first shroud segment 382 positioned toward the first end 316 of the clearance control device 310 with respect to the radial centerline RC and a second shroud segment 384 positioned toward the second end 318 of the clearance control device 310 with respect to the radial centerline RC. In this manner, for this embodiment, the hanger portion 330 extends along the circumferential direction C1 the length of two shroud segments (i.e., the first and second shroud segments 382, 384). In some exemplary embodiments, the hanger portion 330 can extend along the circumferential direction C1 the length of one shroud segment. In yet other exemplary embodiments, the hanger portion 330 can extend along the circumferential direction C1 the length of more than two shroud segments. Stated alternatively, the hanger portion 330 can extend along the circumferential direction C1 the length of any number of shroud segments.

Each shroud segment 382, 384 extends between a radially outer portion or top end 386 and a radially inward portion or bottom end 388 along the radial direction R1 (FIG. 5). Each shroud segment 382, 384 includes an outer wall 390 positioned proximate their respective top ends 386 and an inner wall 392 positioned proximate their respective bottom ends 388 (FIG. 5). The inner wall 392 of each shroud segment has an outer surface 394 and an inner surface 396 opposite the outer surface 394 (FIG. 5). Likewise, the outer wall 390 of each shroud segment 382, 384 has an outer surface 398 and an inner surface 400 opposite the outer surface 398 (FIG. 5). Moreover, each shroud segment 382, 384 extends between a forward end 402 and an aft end 404 along the axial direction A1. Each shroud segment 382, 384 includes a forward wall 406 (FIG. 3) positioned proximate their respective forward ends 402 and an aft wall 408 (FIG. 5) positioned proximate their respective aft ends 404. In addition, each shroud segment 382, 384 extends between a first end 410 and a second end 412 along the circumferential direction C1. Each shroud segment 382, 384 includes a first sidewall 414 positioned proximate their respective first ends 410 and a second sidewall 416 positioned proximate their respective second ends 412 (FIG. 6).

As shown in FIGS. 5 and 6, each shroud segment 382, 384 defines a cooling cavity 420. In particular, the cooling cavity 420 of each shroud segment is defined between the forward wall 406 and the aft wall 408 along the axial direction A1 (FIG. 5), between the outer wall 390 and the inner wall 392 along the radial direction R1 (FIG. 5), and along the circumferential direction C1 (FIG. 6). In some exemplary embodiments, the cooling cavity 420 extends substantially between the first end 410 and the second end 412 of a particular shroud segment (FIG. 6). In this way, a greater circumferential length of the shroud segment can be cooled. As further shown in FIG. 5, the inner wall 392 of each shroud segment 382, 384 defines a plurality of cooling holes 422 extending therethrough. Each of the cooling holes 422 includes an outer opening 424 defined by the outer surface 394 of the inner wall 392 and an inner opening 426 defined by the inner surface 396 of the inner wall 392. The inner opening 426 is spaced apart from the outer opening 424 along the axial direction A1. More particularly, the inner opening 426 is positioned aft of the outer opening 424 along the axial direction A1. In this way, as cooling air flows from the cooling cavity 420 through the cooling holes 422 to the core air flowpath 132 (FIG. 2), the additional surface area provided by the axial orientation of the cooling holes 422 may more efficiently cool the inner wall 392 of a shroud segment. In alternative exemplary embodiments, the cooling holes 422 can be defined by the inner wall 392 along the radial direction R1 without transitioning along the axial direction A1.

As shown in FIG. 6, the clearance control device 310 can include one or more slender beams or axial ligaments 430. For this embodiment, the first shroud segment 382 includes an axial ligament 430 positioned proximate its first end 410 and another axial ligament 430 positioned proximate its second end 412, which in this embodiment, is proximate the radial centerline RC. Likewise, the second shroud segment 384 includes an axial ligament 430 positioned proximate its first end 410, which for this embodiment is proximate the radial centerline RC, and another axial ligament 430 positioned proximate its second end 412. Accordingly, each shroud segment 382, 384 includes an axial ligament at its respective first and second ends 410, 412.

For the illustrated embodiment of FIG. 6, each axial ligament 430 includes an axial member 432 and a connection member 434. The axial member 432 extends along the axial direction A1 and connects the hanger portion 330 with the connection member 434. The connection member 434 extends generally along the radial direction R1 and connects the axial member 432 to one of the shroud segments. More particularly for this embodiment, the connection member 434 connects the axial member 432 with the outer surface 398 of the outer wall 390 of one of the shroud segments. In this way, the axial ligament 430 mechanically couples the shroud portion 380 with the hanger portion 330. Additionally, for this embodiment, each axial ligament 430 is formed of a material that allows for deflection of the axial ligament 430 when one of the shroud segments is actuated or moved along the radial direction R1. In this manner, the axial ligaments 430 do not constrain the shroud segments 382, 384 from movement in the radial direction R1. In some alternative exemplary embodiments, the axial ligament 430 includes an axial member 432 directly connecting the hanger portion 330 with one of the shroud segments.

During operation of the gas turbine engine 100, a pressure differential exists between the forward surface 334 of the forward wall 332 of the hanger portion 330 (FIG. 3) and the aft surface 342 of the aft wall 338 of the hanger portion 330 (FIG. 5). In particular, the pressure of P3 air against the forward wall 332 is greater than the pressure of the air against the aft wall 338. This pressure differential causes significant axial forces on the forward wall 332 of the hanger portion 330. To counteract such axial forces, the one or more axial ligaments 430 provide stiffness to the clearance control device 310 along the axial direction A1 and dampen the forces as they propagate through the axial ligaments 430. In this manner, the axial ligament 430 resists the axial forces exerted on the front wall 332 of the clearance control device 310.

As shown further in FIG. 6, the clearance control device 310 includes a mid-span support 440. The mid-span support 440 extends in a plane along the axial and the radial directions A1, R1 and has a thickness in the circumferential direction C1. The mid-span support 440 extends from the forward wall 332 to the aft wall 338 of the hanger portion 330 and may form a part of the top wall 344. For this embodiment, the mid-span support 440 is positioned along the radial centerline RC (or between the first compliant member and the second compliant member mechanically coupling their respective first and second shroud segments 382, 384 with the hanger portion 330).

When the forward wall 332 of the hanger portion 330 takes on axial loads, the mid-span support 440 assists the circumferential band 358 (FIG. 3) and axial ligaments 430 with counteracting these axial forces such that the clearance control device 310 does not fail under such axial loads. At least a portion of the axial loads are transferred from the circumferential band 358 to the mid-span support 440. The mid-span support 440 dampens the axial forces as they propagate therethrough.

As shown in FIG. 4, for this embodiment, the clearance control device 310 includes a control valve 450. Each clearance control device 310 of the clearance control system 300 can include a corresponding control valve 450. The control valve 450 is in fluid communication with the diffuser cavity 179 (via the outer plenum 208 shown in FIG. 2) and is also in fluid communication with the feed opening 368. The control valve 450 selectively allows an amount of fluid into an actuation chamber defined by the compliant member 470 of the clearance control device 310, and thus controls the pressure change within the actuation chamber 476. For example, depending upon the desired clearance between the turbine blades 166 and the shroud portion 380 of clearance control device 310, the control valve 450 can be actuated to an open position to allow a flow of fluid into the clearance control device 310 or can be actuated to a closed position to prevent a flow of fluid into the clearance control device 310. More particularly, depending upon the desired clearance, the control valve 450 can be actuated to a fully open position or an open position between the fully open position and the closed position or the control valve 450 can be actuated to a closed position to prevent a flow of fluid into the actuation chamber of the clearance control device 310. The control valve 450 can be positioned integral with the feed opening 368 or can be positioned remotely with a conduit extending therebetween such that the valve and opening are in fluid communication. The pressure change within the actuation chamber 476 may also be controlled through the geometry of the opening 368, through bleed passageways in the shroud (e.g., passageway 418), hanger, or compliant member, etc.

As further shown in FIG. 4, for this embodiment, the control valve 450 of the clearance control device 310 is communicatively coupled with an engine controller 452. For this embodiment, the engine controller 452 is an electronic engine controller having Full Authority Digital Electronic Control (FADEC) capability. In alternative exemplary embodiments, the control valve 450 can be communicatively coupled with other suitable computing devices. The engine controller 452 can send one or more signals to the one or more control valves 450 of the clearance control system 300 to actuate the control valves 450 depending upon the desired blade tip clearances CL. Engine controller 452 can also be communicatively coupled with various sensors that can each send the engine controller 452 one or more signals indicative of the current blade tip clearances CL or other useful information that can be used to optimize the blade tip clearances CL. The engine controller 452 can include any suitable hardware and/or software for performing such tasks. As an example, the engine controller 452 can include one or more processors and one or more memory devices. The one or more memory devices can store data and instructions. When the instructions are executed by the one or more processors, the processors perform operations, such as e.g., determining the optimal blade tip clearances CL based upon current operating conditions of the gas turbine engine 100.

Referring now to FIG. 6, the shroud portion 380 defines a number of slits 462. In particular, the first shroud segment 382 defines a first slit portion 464 at its first end 410 and a second slit portion 466 at its second end 412. The second shroud segment 384 defines a first slit portion 464 at its first end 410 and a second slit portion 466 at its second end 412. As shown in FIG. 6, the second slit portion 466 of the first shroud segment 382 and the first slit portion 464 of the second shroud segment 384 define slit 462. A spline seal 460 is positioned within the slit 462. The spline seal 460 seals the clearance control device 310 and prevents combustion gasses 162 from leaking radially from the core air flowpath 132. When adjacent clearance control devices 310 are positioned in place to form a shroud ring (i.e., an annular ring disposed about the longitudinal centerline 102), one adjacent clearance control device 310 can be positioned such that its second slit portion and the first slit portion 464 of the first shroud segment 382 define a slit. In addition, one adjacent clearance control device 310 can be positioned such that its first slit portion and the second slit portion 466 of the second shroud segment 384 define a slit. This same pattern may continue for the entirety of the annularly disposed shroud ring such that the ring is fully sealed along the radial direction R1.

As shown in FIGS. 5 and 6, the clearance control device 310 includes one or more compliant members. For this embodiment, the clearance control device 310 includes a first compliant member 472 and a second compliant member 474. The first compliant member 472 mechanically couples the hanger portion 330 with the first shroud segment 382. The first compliant member 472 extends along the radial direction R1 between the inner surface 346 of the top wall 344 of the hanger portion 330 and the outer wall 390 of the first shroud segment 382. Moreover, the first compliant member 472 extends along the circumferential direction C1 between a position proximate the first end 410 of the first shroud segment 382 and a position proximate the second end 412 of the first shroud segment 382. The first compliant member 472 extends along the axial direction A1 between a position proximate the forward end 402 of the first shroud segment 382 and a position proximate the aft end 404 of the first shroud segment 382.

The first compliant member 472 defines a first actuation chamber 478. The first actuation chamber 478 is in fluid communication with the feed opening 368, which is in turn in fluid communication with a pressure source, which for this embodiment is the diffuser cavity 179 that permits a flow of compressed air 176 having a pressure P3 to flow to the clearance control device 310 in a manner noted previously (i.e., through the outer plenum 208 as shown in FIG. 2). When the compressed air 176 having a pressure P3 enters the clearance control device 310 through the feed opening 368 and into the first actuation chamber 478, the P3 air pressurizes the first actuation chamber 478. This causes the first compliant member 472 to expand along the radial direction R1. The expansion of the first compliant member 472 exerts a force on the first shroud segment 382. This force causes the first shroud segment 382 to move along the radial direction R1. In this way, the blade tip clearance CL between the rotating turbine blades 166 and the first shroud segment 382 can be adjusted.

The second compliant member 474 mechanically couples the hanger portion 330 with the second shroud segment 384. The second compliant member 474 extends along the radial direction R1 between the inner surface 346 of the top wall 344 of the hanger portion 330 and the outer wall 390 of the second shroud segment 384. In addition, the second compliant member 474 extends along the circumferential direction C1 between a position proximate the first end 410 of the second shroud segment 384 and a position proximate the second end 412 of the second shroud segment 384. The second compliant member 474 extends along the axial direction A1 between a position proximate the forward end 402 of the second shroud segment 384 and a position proximate the aft end 404 of the second shroud segment 384.

The second compliant member defines a second actuation chamber 480. The second actuation chamber 480 is in fluid communication with the feed opening 368 via a transition passage 372 defined by a jumper cap 370. When the compressed air 176 having a pressure P3 enters the first actuation chamber 478 and flows into the second actuation chamber 480, the P3 air pressurizes the second actuation chamber 480. This causes the second compliant member 474 to expand along the radial direction R1. The expansion of the second compliant member 474 exerts a force on the second shroud segment 384, which causes the second shroud segment 384 to move along the radial direction R1. In this way, the blade tip clearance CL between the rotating turbine blades 166 and the second shroud segment 384 can be adjusted. The first actuation chamber 478 and the second actuation chamber 480 collectively form an actuation chamber 476. In some embodiments, the actuation chamber 476 is configured in a deadhead chamber configuration. Stated differently, the actuation chamber 476 does not include an outlet for allowing a flow of fluid out of the actuation chamber 476. For example, in some embodiments, the first actuation chamber 478 can deadhead at a deadhead section 479 of the first actuation chamber 478 as depicted in FIG. 5. The deadhead section 479 is shown being defined partially by the first compliant member 472 and partially by the outer surface 398 of the outer wall 390 of the first shroud segment 382. The second actuation chamber 480 can deadhead at a deadhead section 479 of the second actuation chamber 480 in a similar fashion as the first actuation chamber 478.

In alternative exemplary embodiments, the actuation chamber 476 can collectively be formed by any number of actuation chambers. For example, where clearance control device 310 includes only a single compliant member mechanically coupling the hanger portion with the shroud portion, actuation chamber may be a single chamber defined by the single compliant member. As another example, where clearance control device 310 includes three compliant members mechanically coupling three respective shroud segments to a hanger portion, actuation chamber 476 may be collectively formed by the chambers defined by each compliant member (assuming they are in fluid communication with one another).

With reference now to FIGS. 4 and 6, the top wall 344 of the hanger portion 330 includes jumper cap 370. As shown particularly in FIG. 6, the jumper cap 370 protrudes from the outer surface 348 of the top wall 344 of the hanger portion 330 along the radial direction R1. The jumper cap 370 extends along the axial direction A1 and the circumferential direction C1. The jumper cap 370 defines a transition passage 372 that provides fluid communication between the first actuation chamber 478 defined by the first compliant member 472 and the second actuation chamber 480 defined by the second compliant member 474. In this way, the jumper cap 370 extends along the circumferential direction C1 a distance sufficient for the transition passage 372 to provide fluid communication between the first actuation chamber 478 and the second actuation chamber 480. As the first actuation chamber 478 and the second actuation chamber 480 are in fluid communication, compressed air 176 having a pressure P3 can flow from the first actuation chamber 478 serially into the second actuation chamber 480. Consequently, for this embodiment, the clearance control device 310 need only include a single radial pressurization point (i.e., only one feed opening 368 is necessary) to allow for compressed air 176 to enter the clearance control device 310 and to fill into both the first and second actuation chambers 478, 480. In this way, the number of penetration points into the clearance control device 310 is minimized.

As further shown in FIGS. 5 and 6, for this exemplary embodiment, the first and second compliant members 472, 474 are each bellow springs. Thus, for this embodiment, the first compliant member 472 is a first bellow spring 482 and the second compliant member 474 is a second bellow spring 484 (FIG. 6). Each bellow spring 482, 484 includes a forward portion 486 (FIG. 5), an aft portion 488 (FIG. 5), a first portion 490 (FIG. 6), and a second portion 492 (FIG. 6). The portions 486, 488, 490, 492 of the first bellow spring 482 each extend along the radial direction R1 between the inner surface 346 of the top wall 344 of the hanger portion 330 and the outer wall 390 of the first shroud segment 382. In a similar fashion, each portion 486, 488, 490, 492 of the second bellow spring 484 extends along the radial direction R1 between the inner surface 346 of the top wall 344 of the hanger portion 330 and the outer wall 390 of the second shroud segment 384. For this embodiment, the forward, aft, first, and second portions 486, 488, 490, 492 of the first bellow spring 482 define the first actuation chamber 478 and the forward, aft, first, and second portions 486, 488, 490, 492 of the second bellow spring 484 define the second actuation chamber 480.

The forward portion 486 of the first bellow spring 482 extends along the circumferential direction C1 proximate the forward end 402 of the first shroud segment 382 (FIG. 5) and the forward portion 486 of the second bellow spring 484 likewise extends along the circumferential direction C1 proximate the forward end 402 of the second shroud segment 384. The aft portion 488 of the first bellow spring 482 extends along the circumferential direction C1 proximate the aft end 404 of the first shroud segment 382 (FIG. 5) and the aft portion 488 of the second bellow spring 484 extends along the circumferential direction C1 proximate the aft end 404 of the second shroud segment 384. The aft portion 488 of the first bellow spring 482 is positioned aft of and is spaced apart from the forward portion 486 of the first bellow spring 482 along the axial direction A1. Likewise, the aft portion 488 of the second bellow spring 484 is positioned aft of and is spaced apart from the forward portion 486 of the second bellow spring 484 along the axial direction A1.

As shown in FIG. 6, the first portion 490 of the first bellow spring 482 extends along the axial direction A1 proximate the first end 410 of the first shroud segment 382 and the first portion 490 of the second bellow spring 484 extends along the axial direction A1 proximate the first end 410 of the second shroud segment 384. The first portions 490 of each of the first and second bellow springs 482, 484 connect their respective forward and aft portions 486, 488 proximate the first end 410 of their respective shroud segments 382, 384.

As further shown in FIG. 6, the second portion 492 of the first bellow spring 482 extends along the axial direction A1 proximate the second end 412 of the first shroud segment 382 and the second portion 492 of the second bellow spring 484 extends along the axial direction A1 proximate the second end 412 of the second shroud segment 384. The second portions 492 of each of the first and second bellow springs 482, 484 connect their respective forward and aft portions 486, 488 proximate the second end 412 of their respective shroud segments 382, 384. The second portion 492 of the first bellow spring 482 is spaced apart from the first portion 490 of the first bellow spring 482 along the circumferential direction C1. Likewise, the second portion 492 of the second bellow spring 484 is spaced apart from the first portion 490 of the second bellow spring 484 along the circumferential direction C1.

As shown in FIGS. 5 and 6, each bellow spring 482, 484 undulates along the radial direction R1. More particularly for this embodiment, each portion 486, 488, 490, 492 of the first and second bellow springs 482, 484 undulates along the radial direction R1. More particularly still, as shown in FIG. 5, the forward and aft portions 486, 488 of the first and second bellow springs 482, 484 oscillate from forward to aft along the axial direction A1 (or vice versa) as the forward and aft portions 486, 488 undulate along the radial direction R1. Stated differently, the periods $\pi$ of the undulating forward portions 486 and aft portions 488 extend along the radial direction R1 (i.e., the forward and the aft portions 486, 488 undulate along the radial direction R1) and the amplitudes A of the undulating sections of the forward and aft portions 486, 488 extend along the axial direction A1 (i.e., the front and aft portions 486, 488 oscillate from forward to aft along the axial direction A1 (or vice versa)).

As shown particularly in FIG. 6, the first and second portions 490, 492 of the first and second bellow springs 482, 484 oscillate from a position toward the first end 316 to a position toward the second end 318 of the clearance control device 310 (or vice versa) as the first portions 490 and second portions 492 undulate along the radial direction R1. Stated differently, the periods $\tau$ of the undulating first portions 490 and second portions 492 extend along the radial direction R1 (i.e., the first and second portions 490, 492 undulate along the radial direction R1) and the amplitudes A of the undulating sections extend along the circumferential direction C1 (i.e., the first and second portions 490, 492 oscillate from a position toward the first end 316 to a position toward the second end 318 of the clearance control device 310 along the circumferential direction C1 (or vice versa)).

As shown in FIG. 7, the first portion 490 connects with the forward portion 486 of the first bellow spring 482 at a transition portion 494. Similarly, the first portion 490 connects with the aft portion 488 of the first bellow spring 482 at another transition portion 494. Although not shown in FIG. 7, it will be appreciated that the second portion 492 of the first bellow spring 482 connects with the forward portion 486 and the aft portion 488 of the first bellow spring 482 at respective transition portions 494 in a similar fashion as shown with respect to the first portion 490 of the first bellow spring 482. Moreover, transition portions 494 connect the forward portion 486 with the first and second portions 490, 492 and the aft portion 488 with the first and second portions 490, 492 of the second bellow spring 484 in a similar fashion as described above for the first bellow spring 482. At the transition portions 494 of the first and second bellow springs 482, 484, each bellow spring 482, 484 undulates along the radial direction R1 as described above. However, the bellow springs 482, 484 oscillate at least partially from forward to aft along the axial direction A1 (or vice versa) and at least partially from a position toward the first end 316 to a position toward the second end 318 of the clearance control device 310 along the circumferential direction C1 (or vice versa).

In some exemplary embodiments, one of the first or second bellow springs 482, 484 (or both) can include a single portion undulating along the radial direction R1 or more portions than depicted in the embodiment of FIGS. 5 and 6. For example, one of the bellow springs 482, 484 (or both) can include a middle portion positioned between the forward and aft portions 486, 488 along the axial direction A1. The middle portion can extend along the circumferential direction C1 between a position proximate the first end 410 and a position proximate the second end 412 of one of the shroud segments. The middle portion can undulate along the radial direction R1 in a similar fashion described above with respect to the forward and aft portions 486, 488. With the addition of the middle portion, the actuation chamber in which the middle portion is positioned can be partitioned into a forward actuation chamber and an aft actuation chamber. The forward actuation chamber and the aft actuation chamber can be in fluid communication with one another, and more particularly, in serial flow fluid communication with one another.

As another example, one of the first or second bellow springs 482, 484 (or both) can include an axial portion positioned between the first and second portions 490, 492 along the circumferential direction C1. The axial portion can extend along the axial direction A1 between the forward end 402 and the aft end 404 of one of the shroud segments. The axial portion can undulate along the radial direction R1 in a similar fashion described above with respect to the first and second portions 490, 492. With the addition of the axial portion, the actuation chamber in which the axial portion is positioned can be partitioned into a first chamber and a second chamber. The first chamber and the second chamber can be in fluid communication with one another, and more particularly, in serial flow fluid communication with one another.

As further shown in FIGS. 5 and 6, each portion 486, 488, 490, 492 of the first and second bellow springs 482, 484 includes an inner wall 496 and an outer wall 498. The inner wall 496 of each portion 486, 488, 490, 492 of the first bellow spring 482 at least partially defines the first actuation chamber 478 and the inner wall 496 of each portion 486, 488, 490, 492 of the second bellow spring 484 at least partially defines the second actuation chamber 480. The outer wall 498 of each portion 486, 488, 490, 492 of each of the first and second bellow springs 482, 484 faces outward from their respective first and second actuation chambers 478, 480. The inner wall 496 and the outer wall 498 of each portion 486, 488, 490, 492 defines a cooling passage 500. As shown particularly in FIG. 5, the cooling passage 500 is in fluid communication with the cooling plenum 364. In this way, when compressed air 176 flows through the dust cap 360 and collects in the cooling plenum 364, the air within the cooling plenum 364, denoted herein as cooling air 502, can proceed along the cooling passage 500 to cool the first compliant member 472 and the second compliant member 474 and eventually cool the first shroud segment 382 and the second shroud segment 384.

As shown in FIGS. 5 and 6, the cooling passage 500 undulates along the radial direction R1 in a similar fashion as the portions 486, 488, 490, 492 of the first bellow spring 482 and the second bellow spring 484. The cooling passage 500 may extend through the forward portion 486, wrap around to both the first and second portions 490, 492, and then may continue through the aft portion 488 of the bellow spring in which the cooling passage is defined. In this way, the cooling passage 500 can cool the forward portion 486, the first portion 490, the second portion 492, and the aft portion 488 of the bellow spring in which the cooling passage is defined.

Moreover, for this embodiment, a bridge 504 extends along the axial direction A1 between the forward portion 486 and the aft portion 488 of the first bellow spring 482 and defines a bridge passageway 506. The bridge passageway 506 provides fluid communication between the portion of the cooling passage 500 defined by the forward portion 486 and the portion of the cooling passage 500 defined by the aft portion 488 of the first bellow spring 482. The bridge passageway 506 can provide cooling air 502 to the aft portion 488 in a more streamlined fashion. Accordingly, the aft portion 488 can be cooled more efficiently.

As the cooling air 502 flows along the cooling passage 500 generally radially inward along the radial direction R1, the cooling air 502 reaches an outlet port 508 that defines an outlet passage 510. The outlet passage 510 provides fluid communication between the cooling passage 500 and the cooling cavity 420 defined by the first shroud segment 382. In this way, the outlet passage 510 allows cooling air 502 to flow from the cooling passage 500 to the cooling cavity 420. Once in the cooling cavity 420, the cooling air 502 may exit the cooling cavity 420 through the cooling holes 422 as described above.

Although not shown in FIG. 5, an outlet port defining an outlet passage can likewise provide fluid communication between the cooling passage of the second compliant member 474 and the cooling cavity defined by the second shroud segment 384. Additionally, in some exemplary embodiments, the clearance control device 310 can include any suitable number of outlet ports.

With reference now to the FIGS. 2, 5, and 6, the manner in which the clearance control device 310 controls the clearance between the rotating turbine blades and the shroud portion 380 will be described. As shown in FIG. 2, a portion of compressed air 176 flows from the diffuser cavity 179 and downstream into the outer plenum 208. When discharged from the diffuser cavity 179, the compressed air 176 has a pressure P3. For this embodiment, the compressed air 176 flows generally rearward along the axial direction A1 past the combustion section 118 and into the turbine section 120. The compressed air 176 reaches the clearance control device 310 positioned radially outward of the turbine blade 166 of the first stage 212 of the HP turbine 122. At least a portion of the compressed air 176 having a pressure P3 enters the clearance control device 310 positioned radially outward of the turbine blade 166 of the first stage 212 of the HP turbine 122. Moreover, a portion of the compressed air 176 can continue rearward along the axial direction A1 to reach the clearance control device 310 positioned radially outward of the turbine blade 166 of the second stage 214. In a similar fashion, at least a portion of the compressed air 176 having a pressure P3 enters the clearance control device 310 positioned radially outward of the turbine blade 166 of the second stage 214 of the HP turbine 122. In some embodiments, a portion of the compressed air 176 can continue past the HP turbine 122 and can flow along the axial direction A1 to one or more clearance control devices 310 positioned radially outward of a corresponding turbine blade 166 of the LP turbine 124.

Moreover, in some exemplary embodiments, to control the flow of fluid into the clearance control devices 310, the control valves 450 of their respective clearance control devices 310 can selectively allow an amount of fluid into the actuation chamber 476 of the clearance control device 310. For example, depending upon the desired clearance between the turbine blades 166 and the shroud portion 380 of clearance control device 310, the control valve 450 can be actuated to an open position to allow a flow of fluid into the clearance control device 310. When the desired clearance is achieved, the control valve 450 can be actuated to a close position to prevent a flow of fluid into the actuation chamber 476 of the clearance control device 310. An engine controller 452 of the clearance control system 300 can send one or more signals to the control valves 450 indicative of the instructions to open or close the control valves 450.

As noted above, a portion of the compressed air 176 having a pressure P3 flows into one or more clearance control devices 310 of the clearance control system 300. FIGS. 5 and 6 depict an exemplary manner in which the compressed air 176 flows into clearance control device 310. As shown, a portion of the compressed air 176 having a pressure P3 enters the clearance control device 310 through the feed opening 368. For this embodiment, the P3 air first flows into the first actuation chamber 478 defined by the first compliant member 472. As shown particularly in FIG. 5, at least a portion of the P3 air flows through the first actuation chamber 478 inward along the radial direction R1. The P3 air pressurizes the first actuation chamber 478 as the P3 air flows throughout. As the P3 air pressurizes the first actuation chamber 478, the pressurized fluid causes the first compliant member 472 to expand along the radial direction R1. That is, the first compliant member 472 increases in length along the radial direction R1. The expansion of the first compliant member 472 exerts a force on the first shroud segment 382, causing the first shroud segment 382 to move radially inward toward the longitudinal centerline 102 along the radial direction R1. In this way, the blade tip clearances CL can be adjusted to a tighter or more closed position. Accordingly, when it is desired to tighten or close the blade tip clearances CL, the pressure within the first actuation chamber 478 is increased (i.e., by adding additional compressed air 176 having pressure P3). When the pressure within the first actuation chamber 478 is increased, the pressure within the second actuation chamber 480 is likewise increased, which causes the second shroud segment 384 to move radially inward toward the longitudinal centerline 102 along the radial direction R1.

In contrast, when it is desired to set the blade tip clearances CL more open (i.e., increase the distance between the turbine blade tips 216 and shroud portion 380), the pressure within the first actuation chamber 478 is decreased. This can be accomplished by any suitable means. In some exemplary embodiments, for example, the first shroud segment 382 or first compliant member 472 can define a bleed passageway 418 in fluid communication with the first actuation chamber 478 for bleeding an amount of compressed air 176 out of the first actuation chamber 478 such that the pressure within the first actuation chamber 478 can decrease. A valve or plug can block fluid flow from flowing from out of the actuation chamber 476 through the bleed passageway 418 when it is desired to increase or maintain the pressure within the actuation chamber 476. In other exemplary embodiments, the control valve 450 may selectively allow a portion of air within the actuation chamber 476 to bleed out back into the outer plenum 208. In this manner, the pressure within the actuation chamber 476 can be decreased.

When the pressure within the first actuation chamber 478 is decreased, the first compliant member 472 contracts in length along the radial direction R1 (i.e., the compliant member 470 retracts to a relaxed state). When the first compliant member 472 contracts, the first shroud segment 382 is moved radially outward along the radial direction R1 away from the longitudinal centerline 102. In this way, the blade tip clearances CL can be adjusted to a more open position. Open blade tip clearances may be desirable when the aircraft to which the gas turbine engine 100 is coupled is performing a step climb maneuver or during takeoff.

As shown particularly in FIG. 6, for this embodiment, after the compressed air 176 having a pressure P3 enters through the feed opening 368 defined by the top wall 344 of the hanger portion 330, a portion of the compressed air 176 having a pressure P3 flows in a direction along the circumferential direction C1 and into the transition passage 372 defined by the jumper cap 370. The transition passage 372 provides fluid communication between the first actuation chamber 478 and the second actuation chamber 480, as noted previously. Thus, the compressed air 176 can flow from the first actuation chamber 478 to the second actuation chamber 480. Once the compressed air 176 flows into the second actuation chamber 480 defined by the second compliant member 474, the compressed air 176 pressurizes the second actuation chamber 480. In a similar fashion to the first shroud segment 382, the second shroud segment 384 is moveable along the radial direction R1 depending upon the pressurization of the fluid within the second actuation chamber 480. That is, depending upon the pressure within the second actuation chamber 480, the second compliant member 474 is displaced (i.e., expanded or contracted) along the radial direction R1 such that the second shroud segment 384 coupled thereto also is displaced along the radial direction R1. In this way, blade tip clearances CL can be controlled.

Notably, by adjusting the radial displacement of the first shroud segment 382 and the second shroud segment 384 (i.e., the shroud portion 380) by pressurizing the first and second actuation chambers 478, 480 with compressed air 176 having a pressure P3, the need for thermal control air bled from a cooling source (i.e., a bypass duct of a turbofan engine) is eliminated or reduced for controlling the blade tip clearances CL. As a result, more airflow is available for useful work, such as e.g., for providing thrust. Moreover, parasitic bleed air does not negatively affect the engine efficiency cycle. In addition, valves, panels, and duct systems of conventional ACC systems used for extracting and delivering such thermal control air to one or more sections of the gas turbine engine 100 is eliminated or reduced. Thus, the weight of the engine can be reduced. Furthermore, the cowl packaging disposed about the turbine sections can be improved as external ducts extending through the cowl need not be accounted for. Also, because the clearance control devices 310 of the clearance control system 300 need not account for large thermal masses to control blade tip clearances CL, the blade tip clearances CL can be adjusted without a predetermined lag time. Indeed, in some exemplary embodiments, adjustment of the first and second shroud segments 382, 384 along the radial direction R1 can occur nearly instantaneously. In this way, tighter clearances can be achieved, leading to a fuel burn advantage and ultimately improved engine efficiency and performance.

Referring now to FIGS. 2 through 6, the manner in which the clearance control device 310 is cooled will be described. Compressed air 176 flowing along the axial direction A1 through the outer plenum 208 initially reaches the forward wall 332 of the hanger portion 330 (FIG. 2). A portion of the compressed air 176 flows through the plurality of openings 362 defined by the dust cap 360 positioned along the forward wall 332 of the hanger portion 330 (FIG. 3). The air then flows into the cooling plenum 364 defined by the portion 366 of the aft surface 336 of the forward wall 332 (FIG. 5). The portion of the compressed air 176 that flows through the dust cap 360, or cooling air 502, collects in the cooling plenum 364 and then proceeds along the cooling passage 500 defined between the inner wall 496 and the outer wall 498 of the first compliant member 472.

The cooling air 502 begins by flowing generally radially inward along the radial direction R1, and more particularly, the cooling air 502 flows generally radially inward along the undulating cooling passage 500 defined by the forward portion 486 of the first compliant member 472. As the cooling air 502 flows along the cooling passage 500, a portion of cooling air 502 flows across the bridge passageway 506 defined by the bridge 504. The bridge passageway 506 provides fluid communication between the forward portion 486 and the aft portion 488 of the first compliant member 472, as noted above. After a portion of the cooling air 502 flows across the bridge passageway 506, that portion of cooling air 502 flows in the cooling passage 500 defined by the aft portion 488 of the first compliant member 472.

Additionally, the cooling passages 500 defined by the forward, aft, first, and second portions 486, 488, 490, 492 of the first and second compliant members 472, 482 are in fluid communication with one another, and thus, cooling air 502 flows into each passage of the various portions 486, 488, 490, 492 of the first and second compliant members 472, 482. This allows for cooling air 502 to cool each portion 486, 488, 490, 492 of the first and second compliant members 472, 482.

As the cooling air 502 flows radially inward toward the shroud portion 380, a portion of the cooling air 502 flows through the outlet passage 510 defined by the outlet port 508. The cooling air 502 then flows into the cooling cavity 420 to cool the various walls of the shroud segment in which the cooling cavity 420 is defined. Thereafter, the cooling air 502 flows through the cooling holes 422 defined by the inner wall 392 of the respective first and second shroud segments 382, 384. In particular, the cooling air 502 flows through the outer openings 424 of each cooling hole 422, flows generally rearward along the axial direction A1, and then exits through the inner openings 426 of the cooling holes 422 and into the core air flowpath 132 for cooling the rotating components of the core turbine engine 106 and reducing exhaust temperatures.

The exemplary embodiments of clearance control device 310 described herein may be manufactured or formed using any suitable process. However, in accordance with several aspects of the present subject matter, clearance control device 310 may be formed using an additive-manufacturing process, such as e.g., a 3-D printing process. The use of such a process may allow clearance control device 310 to be formed integrally, as a single monolithic component, or as any suitable number of sub-components. For this exemplary embodiment, for example, the hanger portion 330, the shroud portion 380, and the compliant member 470 are formed of a single monolithic piece.

In particular, the manufacturing process may allow clearance control device 310 to be integrally formed and include a variety of features not possible when using prior manufacturing methods. For example, the additive manufacturing methods described herein enable the manufacture of clearance control device having various features, configurations, thicknesses, materials, densities, fluid passageways, compliant members, spline seals, and mounting structures not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), or other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, ceramics, nickel alloys, chrome alloys, titanium, titanium alloys, magnesium, magnesium alloys, aluminum, aluminum alloys, and nickel or cobalt-based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials and/or other suitable materials not expressly listed. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in some exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal or ceramic, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways with integral mounting features. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved control of the blade tip clearances CL.

Figure 8:
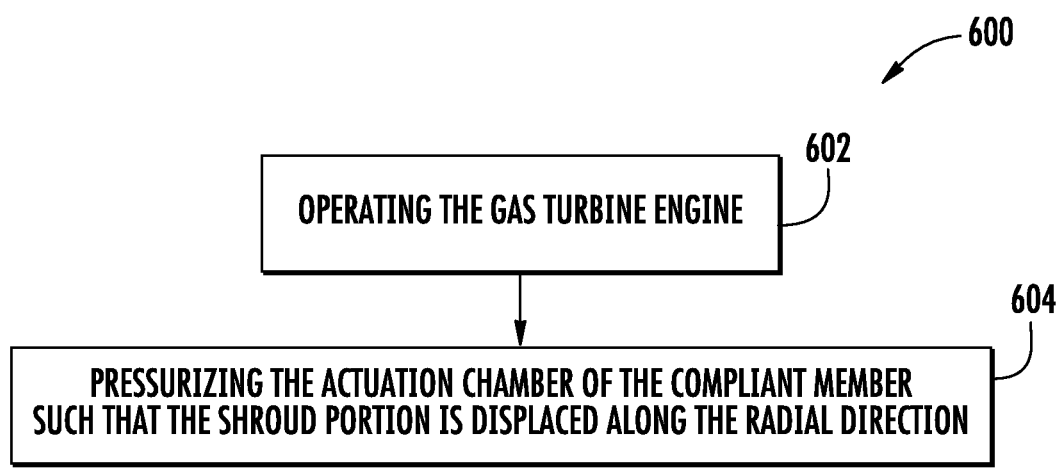
FIG. 8 is an exemplary flow diagram according to various embodiments of the present subject matter.

FIG. 8 depicts a flow diagram of an exemplary method (600) for adjusting the blade tip clearances of a gas turbine engine, such as e.g., the exemplary gas turbine engine 100 depicted and described herein, according to an exemplary embodiment of the present disclosure. Some or all of the method (600) can be implemented by the clearance control devices 310 disclosed herein.

At (602), exemplary method (600) includes operating the gas turbine engine. When the gas turbine engine 100 is operated, the compressor section 112 progressively compresses air 154 that has entered through the annular inlet 110 of the core turbine engine 106 (FIG. 1). Thereafter, compressed air 176 is discharged into the combustion section 118 where at least a portion of the compressed air 176 having a pressure P3 flows into the outer plenum 208 of the combustion section 118. The compressed air 176 flows along the axial direction A1 to the turbine section 120.

At (604), exemplary method (600) includes pressurizing the actuation chamber of the compliant member such that the shroud portion is displaced along the radial direction. When the compressed air 176 reaches one of the gas control devices 310, a portion of the air enters the clearance control device 310 through the feed opening 368. The air that enters the clearance control device 310 has a pressure P3. The pressurized airflow fills into the actuation chamber 476 find by the compliant member 470. Upon doing so, the pressurized air causes the compliant member 470 to expand along the radial direction R1. This in turn causes the shroud portion 380 to be displaced along the radial direction R1, as the compliant member 470 exerts a force on the shroud portion 380. Thus, by pressurizing the actuation chamber 476 defined by the compliant member 470, the shroud portion 380 can be displaced along the radial direction R1.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A clearance control device for an engine, the clearance control device defining an axial direction, a radial direction, and a circumferential direction, the clearance control device comprising:
   a hanger portion;
   a shroud portion; and
   a compliant member mechanically coupling the hanger portion with the shroud portion and defining an actuation chamber for receiving a fluid;
   wherein the shroud portion is moveable along the radial direction in response to a pressure change within the actuation chamber, and
   wherein the hanger portion, the shroud portion, and the compliant member are formed of a monolithic piece.

2. The clearance control device of claim 1, wherein the compliant member is a bellow spring extending between the hanger portion and the shroud portion, and wherein the bellow spring undulates along the radial direction.

3. The clearance control device of claim 1, wherein the hanger portion comprises:
   a forward wall;
   an aft wall; and
   a top wall extending between the forward wall and the aft wall, the top wall defining a feed opening in fluid communication with the actuation chamber.

4. The clearance control device of claim 1, wherein the hanger portion includes a forward wall having a front surface and an aft surface, the forward wall defining a plurality of openings therethrough, the aft surface at least partially defining a cooling plenum, and wherein the compliant member includes an inner wall and an outer wall defining a cooling passage therebetween, the cooling passage in fluid communication with the cooling plenum, and wherein the shroud portion further includes a shroud segment defining a cooling cavity, the cooling cavity in fluid communication with the cooling passage.

5. The clearance control device of claim 4, wherein the shroud segment includes an inner wall having an inner surface and an outer surface opposite the inner surface, the inner wall partially at least partially defining the cooling cavity, and wherein the inner wall defines a plurality of cooling holes extending therethrough, at least one of the cooling holes includes an outer opening defined by the outer surface of the inner wall and an inner opening defined by the inner surface of the inner wall, and wherein the inner opening is spaced apart from the outer opening along the axial direction.

6. The clearance control device of claim 1, wherein the clearance control device further comprises:
   an axial ligament mechanically coupling the shroud portion with the hanger portion, the axial ligament having an axial member extending along the axial direction.

7. The clearance control device of claim 1, wherein the clearance control device extends between a forward end and an aft end along the axial direction, between a first end and a second end along the circumferential direction, and between a top end and a bottom end along the radial direction, the clearance control device further defining a radial centerline, and wherein the compliant member is a first compliant member, and wherein the clearance control device further comprises:
   a second compliant member, and
   wherein the shroud portion comprises:
   a first shroud segment positioned between the first end and the radial centerline; and
   a second shroud segment positioned between the second end and the radial centerline;
   wherein the first compliant member mechanically couples the first shroud segment with the hanger portion and the second compliant member mechanically couples the second shroud segment with the hanger portion.

8. The clearance control device of claim 7, wherein the actuation chamber is a first actuation chamber defined by the first compliant member and the second compliant member defines a second actuation chamber, and wherein the hanger portion further comprises:

a jumper cap defining a transition passage, the transition passage providing fluid communication between the first actuation chamber and the second actuation chamber.

9. The clearance control device of claim 7, wherein the actuation chamber is a first actuation chamber defined by the first compliant member and the second compliant member defines a second actuation chamber, and wherein the hanger portion further comprises:
a forward wall;
an aft wall;
a top wall extending between the forward wall and the aft wall; and
a mid-span support extending in a plane along the axial and the radial directions and having a thickness in the circumferential direction, the mid-span support extending from the top wall and the forward wall of the hanger portion and positioned between the first compliant member and the second compliant member.

10. The clearance control device of claim 1, wherein the shroud portion comprises a first shroud segment, the first shroud segment extending between a first end and a second end along the circumferential direction, and wherein the compliant member is a bellow spring extending between the hanger portion and the shroud portion, the bellow spring comprising:
a forward portion;
an aft portion spaced apart from the forward portion along the axial direction;
a first portion connecting the forward portion with the aft portion proximate the first end of the first shroud segment; and
a second portion connecting the forward portion with the aft portion proximate the second end of the first shroud segment;
wherein the forward portion, the aft portion, the first portion, and the second portion of the bellow spring undulate along the radial direction.

11. The clearance control device of claim 10, wherein the forward and aft portions oscillate along the axial direction as the forward and aft portions undulate along the radial direction and wherein the first and second portions oscillate along the circumferential direction as the first and second portions undulate along the radial direction.

12. The clearance control device of claim 10, wherein the forward portion, the aft portion, the first portion, and the second portion of the bellow spring each include an inner wall and an outer wall defining a cooling passage therebetween, and wherein the cooling passage defined by the forward portion and the cooling passage defined by the aft portion are in fluid communication via a bridge passageway extending along the axial direction and defined by a bridge.

13. The clearance control device of claim 10, wherein the actuation chamber is a deadheaded chamber.

14. The clearance control device of claim 10, wherein the shroud portion comprises a shroud segment defining a bleed passageway in fluid communication with the actuation chamber, the bleed passageway configured to selectively allow the fluid within the actuation chamber to bleed out.

15. A gas turbine engine defining an axial direction, a radial direction, and a circumferential direction, the gas turbine engine comprising:
a compressor section, a combustion section, and a turbine section in serial flow relationship and together at least partially defining a core air flowpath, the combustion section defining a diffuser cavity and a combustion chamber, the diffuser cavity located upstream of the combustion chamber;
a clearance control device, comprising:
a hanger portion;
a shroud portion; and
a compliant member mechanically coupling the hanger portion with the shroud portion and defining an actuation chamber in fluid communication with the diffuser cavity, wherein the shroud portion is moveable along the radial direction in response to a pressure change within the actuation chamber, and wherein the hanger portion, the shroud portion, and the compliant member are formed of a monolithic piece.

16. The gas turbine engine of claim 15, wherein the hanger portion defines a feed opening that provides fluid communication between the actuation chamber and the diffuser cavity, and wherein the gas turbine engine further comprises:
a control valve in fluid communication with the feed opening for selectively allowing an amount of fluid into the actuation chamber of the clearance control device.

17. The gas turbine engine of claim 15, wherein the compliant member is a bellow spring extending between the hanger portion and the shroud portion along the radial direction, and wherein the bellow spring undulates along the radial direction.

18. The gas turbine engine of claim 15, wherein the clearance control device extends between a forward end and an aft end along the axial direction, between a first end and a second end along the circumferential direction, and between a top end and a bottom end along the radial direction, the clearance control device further defining a radial centerline, and wherein the compliant member comprises a first compliant member and a second compliant member, and wherein the shroud portion comprises:
a first shroud segment positioned toward the first end with respect to the radial centerline; and
a second shroud segment positioned toward the second end with respect to the radial centerline;
wherein the first and second shroud segments each extend between a first end and a second end along the circumferential direction and each have a first sidewall at the first end and a second sidewall at the second end, the first sidewall of each of the shroud segments defining a first slit portion and the second sidewall of each of the shroud segments defining a second slit portion, the second slit portion of the first shroud segment and the first slit portion of the second shroud segment forming a slit, and wherein the clearance control device further comprises:
a spline seal positioned within the slit for sealing the first shroud segment and the second shroud segment along the radial direction during operation of the gas turbine engine.

19. A method for adjusting the blade tip clearances of a gas turbine engine, the gas turbine engine defining an axial direction, a radial direction, and a circumferential direction, and the gas turbine engine comprising a plurality of blades rotatable about the axial direction and a clearance control device disposed about the circumferential direction and spaced apart from the blades along the radial direction, the clearance control device having a hanger portion, a shroud portion, and a compliant member mechanically coupling the hanger portion with the shroud portion, the compliant member defining an actuation chamber, the method comprising:
operating the gas turbine engine; and pressurizing the actuation chamber of the compliant member such that the shroud portion is displaced along the radial direction, wherein the hanger portion, the shroud portion, and the compliant member are formed of a monolithic piece.

20. The gas turbine engine of claim 15, wherein the hanger portion includes a forward wall having a front surface and an aft surface, the forward wall defining a plurality of openings therethrough, the aft surface at least partially defining a cooling plenum, and wherein the compliant member includes an inner wall and an outer wall defining a cooling passage therebetween, the cooling passage in fluid communication with the cooling plenum, and wherein the shroud portion further includes a shroud segment defining a cooling cavity, the cooling cavity in fluid communication with the cooling passage.

* * * * *